United States Patent [19]

Hisgen et al.

[11] Patent Number: 4,727,129
[45] Date of Patent: Feb. 23, 1988

[54] WHOLLY AROMATIC MESOMORPHIC POLYESTER AMIDE IMIDES AND THE PREPARATION THEREOF

[75] Inventors: Bernd Hisgen, Limburgerhof; Hans-Jakob Kock, Ludwigshafen, both of Fed. Rep. of Germany

[73] Assignee: BASF Aktiengesellschaft, Ludwigshafen, Fed. Rep. of Germany

[21] Appl. No.: 937,678

[22] Filed: Dec. 4, 1986

[30] Foreign Application Priority Data

Dec. 4, 1985 [DE] Fed. Rep. of Germany ....... 3542798

[51] Int. Cl.⁴ .................. C08G 69/44; C08G 73/16
[52] U.S. Cl. ........................... 528/171; 528/125; 528/172; 528/183; 528/184; 528/190; 528/193; 528/194; 528/210; 528/220
[58] Field of Search ............ 528/125, 171, 172, 183, 528/184, 190, 193, 194, 210, 220

[56] References Cited

U.S. PATENT DOCUMENTS

| | | | |
|---|---|---|---|
| 4,118,372 | 10/1978 | Schaefgen | 528/190 |
| 4,176,223 | 11/1979 | Irwin | 528/170 |
| 4,351,918 | 9/1982 | Charbonneau et al. | 524/602 |
| 4,375,530 | 3/1983 | Hay et al. | 524/605 |
| 4,383,105 | 5/1983 | Irwin | 528/170 |
| 4,398,019 | 8/1983 | Cox et al. | 528/183 |
| 4,414,381 | 11/1983 | Griffin et al. | 528/190 |
| 4,499,256 | 2/1985 | Blundell et al. | 528/172 |
| 4,564,669 | 1/1986 | Dicke et al. | 528/173 |
| 4,623,732 | 11/1986 | Peters | 548/480 |

FOREIGN PATENT DOCUMENTS

131846 7/1984 Fed. Rep. of Germany .

Primary Examiner—Lucille M. Phynes
Attorney, Agent, or Firm—Keil & Weinkauf

[57] ABSTRACT

Wholly aromatic mesomorphic polyester amide imides which form a liquid-crystalline fiber-forming melt below 320° C. and are composed of (a) from 5 to 35 mol % of repeat units of the formula I and/or II

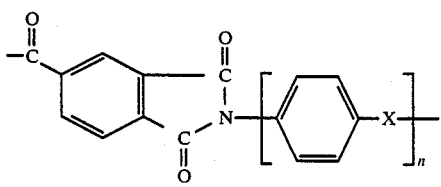

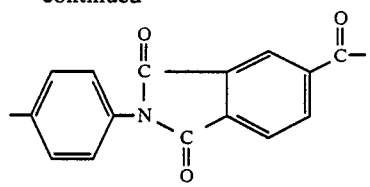

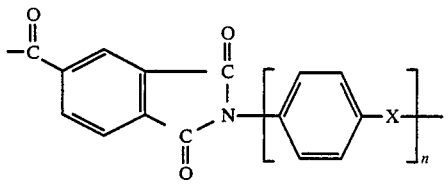

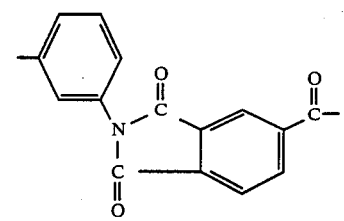

where X can be identical or different, each X being —O—, —S—, —SO$_2$—, —CO—, —CH$_2$— or =C(CH$_3$)$_2$, and n is 0 or 1

(b) from 0 to 30 mol % of repeat units of the formulae III and/or IV

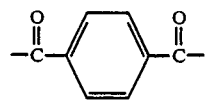 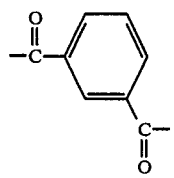

III      IV (c) a molar amount corresponding to the total amount of components (a) and (b) of one or more of the repeat units V, VI, VII, VIII, IX or X in an amount of (c1) from 3 to 35 mol % of units of the formula V

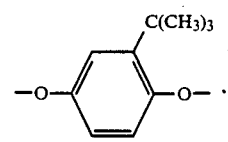

(c2) from 0 to 10 mol % of units of the formula VI

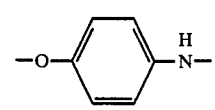

(c3) from 2 to 25 mol % of units of the formula VII (Abstract continued on next page.)

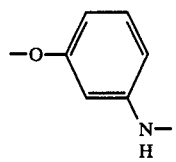 VII (c4) from 2 to 20 mol % of units of the formula VIII

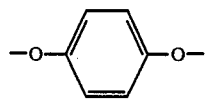 VIII (c5) from 0 to 20 mol % of the units of the formula IX

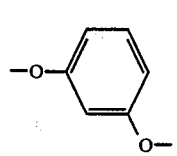 IX (c6) from 2 to 20 mol % of units of the formula X

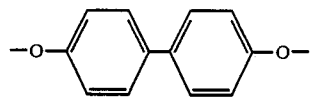 X the total of the mole percentages of components (c1), (c2), (c3), (c4), (c5) and (c6) equalling in each case the total of the mole percentages of components (a) and (b);

(d) not less than 10 mol % of repeat units of the formula XI

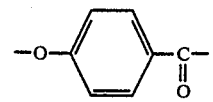 XI (e) from 0 to 25 mol % of one or more of the repeat units of the formula XII, XIII or XIV

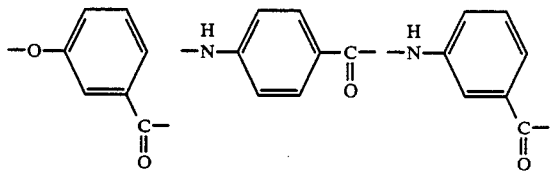

XII    XIII    XIV the mole percentages of components (a), (b), (c), (d) and (e) adding up to 100 mol % in each case, the preparation thereof and fibers, films and moldings prepared therefrom.

10 Claims, No Drawings

WHOLLY AROMATIC MESOMORPHIC POLYESTER AMIDE IMIDES AND THE PREPARATION THEREOF

The present invention relates to wholly aromatic mesomorphic polyester amide imides which form a liquid-crystalline fiber-forming melt below 320° C.

U.S. Pat. No. 4,383,105 discloses polyester imides which are based on hydroxynaphthalenecarboxylic acid, 4-hydroxybenzoic acid and 4-carboxy-N-(p-hydroxyphenyl)phthalimide. However, these polyester imides require processing temperature of above 320° C., as do the polyester imides disclosed in U.S. Pat. No. 4,176,223, which are derived from 4-(4-hydroxyphthalimido)phenol, terephthalic acid and naphthalenedicarboxylic acid as well as substituted or unsubstituted hydroquinones. Moreover, disubstituted naphthalene components are costly starting materials. U.S. Pat. No. 4,330,457 discloses polyester amides based on hydroxynaphthalenecarboxylic acid, terephthalic acid, hydroquinone and p-aminophenol. However, these polyester amides have a glass transition temperature of about 105° C. and thus lack adequate heat distortion resistance.

It is an object of the present invention to provide wholly aromatic mesomorphic polyester amide imides which are processable from the belt below 320° C., and which have a high heat distortion resistance and a smooth abrasion-resistant surface.

We have found that this object is achieved with wholly aromatic mesomorphic polyester amide imides which form a liquid-crystalline fiber-forming melt below 320° C. and are composed of (a) from 5 to 35 mol% of repeat units of the formula I and/or II

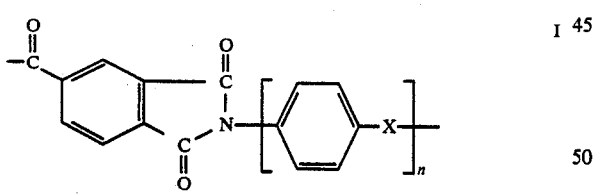

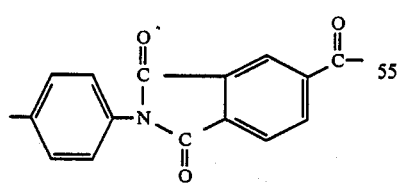

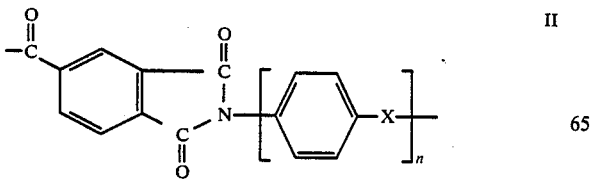

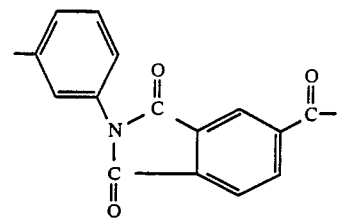

where X can be identical or different, each X being —O—, —S—, —SO$_2$—, —CO—, —CH$_2$— or =C(CH$_3$)$_2$, and n is 0 or 1

(b) from 0 to 30 mol% of repeat units of the formulae III and/or IV

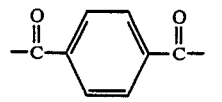 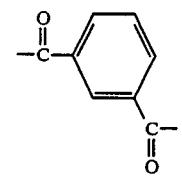

III    IV (c) a molar amount corresponding to the total amount of components (a) and (b) of one or more of the repeat units V, VI, VII, VIII, IX or X in an amount of (c1) from 3 to 35 mol% of units of the formula V

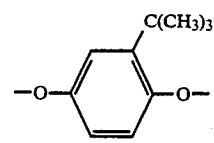

V (c2) from 0 to 10 mol% of units of the formula VI

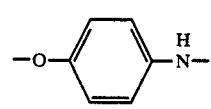

VI (c3) from 2 to 25 mol% of units of the formula VII

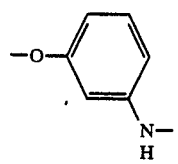

VII (c4) from 2 to 20 mol% of units of the formula VIII

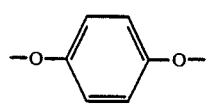

VIII (c5) from 0 to 20 mol% of units of the formula IX (c6) from 2 to 20 mol% of units of the formula X

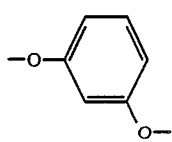

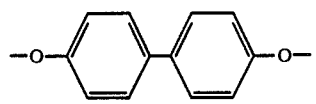

the total of the mole percentages of components (c1), (c2), (c3), (c4), (c5) and (c6) equaling in each case the total of the mole percentages of components (a) and (b);

(d) not less than 10 mol% of repeat units of the formula XI

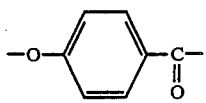

(e) from 0 to 25 mol% of one or more of the repeat units of the formula XII, XIII or XIV

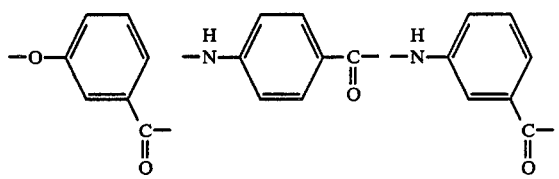

the mole percentages of components (a), (b), (c), (d) and (e) adding up to 100 mol% in each case.

The novel wholly aromatic polyester amide imides have the advantage of combining a high heat distortion resistance with a smooth surface. The novel polyester amide imides further have a high stiffness, strength and resilience. In addition, the novel polyester amide imides are substantially resistant to chemicals and of low flammability. Finally, the novel polyester amide imides can be processed from the melt at below 320° C.

The liquid-crystalline state of the polyester amide imides can be detected with a polarization microscope by a method described in German Published Application DAS No. 25,20,819. Applied in a thickness of 10 μm between glass plates and viewed between crossed polarizers, the polymer melts have textures which can be ascribed to a mesomorphic phase.

The polyester amide imides according to the invention are composed of (a) from 5 to 35 mol%, in particular from 7 to 25 mol%, of repeat units of the formulae I and/or II, where X can be identical or different, being in each case —O—, —S—, —SO₂—, —CO—, —CH₂— or =C(CH₃)₂, preferably —O—, —SO₂— or —CH₂—, and n is 0 or 1, in particular 1.

Suitable starting compounds are for example 4,4'-bis[(4-carboxy)-N-phthalimido]diphenyl ether, 4,4'-bis[(4-carboxy)-N-phthalimido]diphenylmethane, 4,4'-bis[(4-carboxy)-N-phthalimido]diphenyl sulfone, 4,4'-bis[(4-carboxy)-N-phthalimido]diphenyl sulfide, 4,4'-bis[(4-carboxy)-N-phthalimido]diphenyl ketone for units of the formula I, and 3,4'-bis[(4-carboxy)-N-phthalimido]diphenyl ether, 3,4'-bis[(4-carboxy)-N-phthalimido]diphenyl sulfide, 3,4'-bis[(4-carboxy)-N-phthalimido]diphenyl sulfone, 3,4'-bis[(4-carboxy)-N-phthalimido]diphenyl ketone, 3,4'-bis[(4-carboxy)-N-phthalimido]diphenylmethane for units of the formula II.

(b) From 0 to 30 mol%, in particular from 0 to 20 mol%, of repeat units of the formulae III and/or IV. Advantageous starting materials are terephthalic acid, for units of the formula III, and isophthalic acid, for units of the formula IV.

(c) A molar amount corresponding to the total amount of components (a) and (b) of one or more of the repeat units V, VI, VII, VIII, IX or X, with the proviso that the units mentioned are present in the following molar amounts:

(c1) from 3 to 35 mol% of units of the formula V
(c2) from 0 to 10 mol% of units of the formula VI
(c3) from 2 to 25 mol% of repeat units of the formula VII
(c4) from 2 to 20 mol% of repeat units of the formula VIII
(c5) from 0 to 20 mol% of repeat units of the formula IX
(c6) from 2 to 20 mol% of repeat units of the formula X.

It will be readily understood that the molar proportions of components (c1), (c2), (c3), (c4), (c5) and (c6) present in the polyester amide imides correspond in each case to the molar proportion of the total amount of components (a) and (b).

Advantageous starting materials are for units of the formula V t-butyl-hydroquinone, for units of the formula VI 4-aminophenol, for units of the formula VII 3-aminophenol, for units of the formula VIII hydroquinone, for units of the formula IX resorcinol, for units of the formula X 4,4'-dihydroxybiphenyl.

(d) Not less than 10 mol%, in particular not less than 20 mol%, of repeat units of the formula XI. An advantageous starting compound is p-hydroxybenzoic acid.

(e) From 0 to 25 mol%, in particular from 0 to 20 mol%, of one or more of the repeat units XII, XIII or XIV. Advantageous starting materials are for units of the formula XII n-hydroxybenzoic acid, for units of the formula XIII p-aminobenzoic acid, for units of the formula XIV m-aminobenzoic acid.

It will be readily understood that the molar proportions of components (a), (b), (c) and (d) add up to 100 mol% in each case.

Preferred polyester amide imides contain as component (c) from 5 to 25 mol% of repeat units of the formula V, from 2 to 8 mol% of repeat units of the formula VI, from 5 to 20 mol% of repeat units of the formula VII and/or from 5 to 20 mol% of one or more of the repeat units of the formula VIII, IX or X.

Particularly preferred polyester amide imides contain as component (c) from 5 to 20 mol% of repeat units of the formula V, from 5 to 15 mol% of repeat units of the formula VII and from 5 to 16 mol% of repeat units of the formula VIII and/or X.

Preferred wholly aromatic polyester amide imides according to the invention have a glass transition temperature Tg of ≧140° C., in particular ≧150° C. The glass transition temperature is measured by the DSC method as described in Makromol. Chem. 127 (1969), 1. The wholly aromatic liquid-crystalline polyester amide imides according to the invention form a liquid-crystalline fiber-forming melt at <320° C. Preference is also given to liquid-crystalline aromatic polyester amide imides which have partial crystallinity at >200° C. and <300° C.

The liquid-crystalline polyester amide imides according to the invention can be obtained in a manner similar to that described for example in U.S. Pat. Nos. 4,375,530 and 4,118,372.

In an advantageous embodiment, the polyester amide imides according to the invention are obtained in a single-stage process by converting the underivatized starting compounds using anhydrides of lower fatty acids, for example fatty acids of 2 to 4 carbon atoms, in particular acetic anhydride. This reaction may be catalyzed with conventional amounts of catalysts of the type disclosed in EP Application No. 131,846. In the conversion, the underivatized starting materials are heated together with the fatty acid anhydride, which is advantageously present in a molar excess of not less than 5%, based on the hydroxyl and amino groups present, with stirring in an inert gas atmosphere to a temperature at which reflux occurs. Advantageously the temperature is increased in stages, for example to 130°–200° C. in not more than 5 hours, preferably up to 2 hours. The temperature is then raised to 250°–350° C., for example in the course of 2–2½ hours, while excess fatty acid anhydrides and fatty acids are distilled off. To complete the reaction, it has been found to be advantageous to employ reduced pressure, for example 200–0.1 mbar, towards the end of the reaction.

It is a remarkable and unforseeable feature of this single-stage process that the desired polymers are obtained in a relatively short time in a troublefree and complete reaction without catalysts. This is all the more remarkable as the large number of chemically different hydroxyl and amino groups would be expected to lead to differences in reactivity and hence to inadequate polymer synthesis.

The wholly aromatic liquid-crystalline polyester amide imides thus obtained are advantageously further condensed in the solid state, for example at 150°–250° C., until the desired viscosity is obtained. This postcondensation in solid phase can take place not only before but also after thermoplastic processing. The solid phase condensation is advantageously carried out in an inert gas atmosphere, for example nitrogen.

The polyester amide imides can contain conventional additives and assistants in active amounts. Conventional additives and assistants are stabilizers, oxidation inhibitors, agents against thermal decomposition and decomposition by ultraviolet light, lubricants, mold release agents, colorants such as dyes or pigments, fibrous or pulverulent fillers and reinforcing agents, nucleating agents or plasticizers.

Stabilizers can be added to the polymers at any stage of processing or when completed. Preferably the stabilizers are added early on to prevent the onset of decomposition before the polymers are protected.

Suitable oxidation inhibitors and heat stabilizers are for example halides of metals of group I of the periodic table, for example halides of sodium, potassium or lithium with copper (I) halides, for example chlorides, bromides or iodides, and also sterically hindered phenols, hydroquinones, various substituted representatives of these groups and combinations thereof in concentrations of up to 1% by weight, based on the polymer.

Suitable UV stabilizers are, for example, substituted resorcinols, salicylates, benzotriazoles or benzophenones and the like and also mixtures thereof. These UV stabilizers are generally used in amounts of up to 2% by weight, based on the polymer.

Suitable assistants also include dyes, which are generally employed in amounts of up to 5% by weight, such as nigrosine, pigments, such as titanium dioxide, cadmium sulfide, cadmium sulfide selenide, phthalocyanines, ultramarine blue or carbon black.

Suitable fibrous or pulverulent fillers and reinforcing agents, which are employed in amounts up to 70% by weight based on the polymer, are for example carbon fibers, glass fibers, amorphous silica, asbestos, calcium silicate, aluminum silicate, magnesium carbonate, kaolin, chalk, quartz powder, mica or feldspar.

Suitable nucleating agents are for example talc, calcium fluoride, sodium phenylphosphinate, aluminum oxide or finely divided polytetrafluoroethylene.

Finally, suitable additives can also be plasticizers in amounts of, for example up to 20% by weight, such as dioctyl phthalate, dibenzyl phthalate, butyl benzyl phthalate, hydrocarbon oils, N-n-butylbenzenesulfonamide and o- and p-tolueneethylsulfonamide.

The wholly aromatic liquid-crystalline polyester amide imides according to the invention are suitable for preparing filaments, fibers, films, foams and industrial moldings by injection molding, press molding or extrusion. The moldings prepared from the polyester amide imides according to the invention have excellent mechanical properties such as stiffness, strength and resilience. They are remarkably resistant to chemicals and flame-retardant. They also have a high heat distortion resistance and a smooth abrasion-resistant surface. The polyester amide imides according to the invention are therefore highly suitable for preparing moldings for electrical engineering, data processing, automotive construction and other industrial sectors. However, they can also be used as surface coating materials, in pulverulent dispersion or as film.

The invention is illustrated by the following examples.

EXAMPLE 1

0.085 mol of terephthalic acid, 0.22 mol of 4-hydroxybenzoic acid, 0.0595 mol of tert.-butylhydroquinone, 0.0595 mol of hydroquinone, 0.051 mol of 3-aminophenol, 0.085 mol of the compound

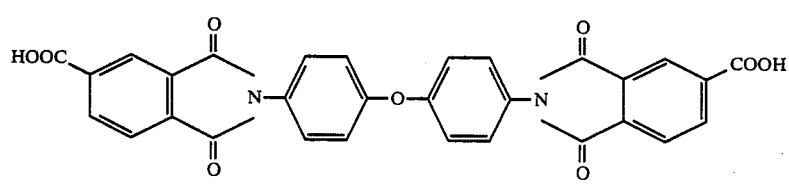

and 134 ml of acetic anhydride are heated with stirring under nitrogen from 150° C. to 300° C. in the course of 2 h 50 min, while excess acetic anhydride and acetic acid are distilled off. The pressure is then reduced to 45 mbar in the course of 20 min to give a viscous fiber-forming melt. The polymer melt and the cold polymer have a pearlescent luster. The polymer has a smooth, hard and abrasion-resistant surface. DSC measurements indicate a glass transition temperature of 165° C. The intrinsic viscosity is 0.69 dl/g, measured at 60° C. in an 0.1% strength (wt./vol.) solution in pentafluorophenol.

EXAMPLE 2

0.07 mol of terephthalic acid, 0.28 mol of 4-hydroxybenzoic acid, 0.07 mol of t-butylhydroquinone, 0.07 mol of 3-aminophenol, 0.07 mol of the compound

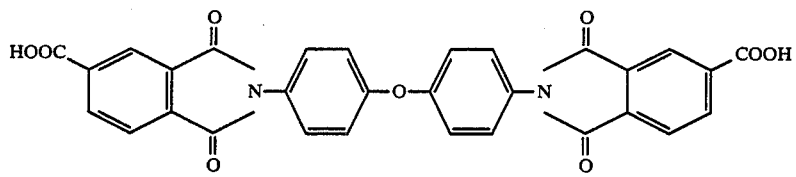

and 114 ml of acetic anhydride are heated with stirring under nitrogen from 150° C. to 300° C. in the course of 2 h 50 min, while excess acetic anhydride and acetic acid are distilled off. The pressure is then reduced to 100 mbar in the course of 20 min to give a viscous fiber-forming melt. The polymer melt and the cold polymer have a pearlescent luster. The polymer has a smooth, hard, abrasion-resistant surface. DSC measurements indicate a glass transition temperature of 173° C. The intrinsic viscosity is 2.94 dl/g, measured at 60° C. in an 0.1% strength (wt./vol.) solution in pentafluorophenol.

We claim:

1. A wholly aromatic mesomorphic polyester amide imide which forms a liquid-crystalline fiber-forming melt below 320° C. and is composed of (a) from 5 to 35 mol% of repeat units of the formula I and/or II

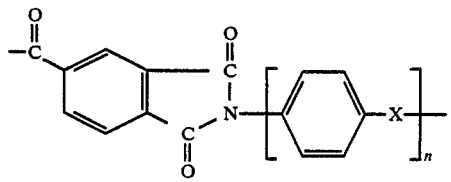

I

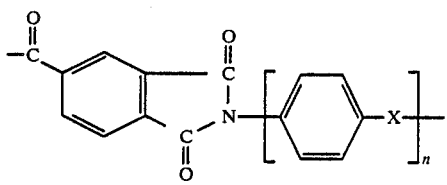

II

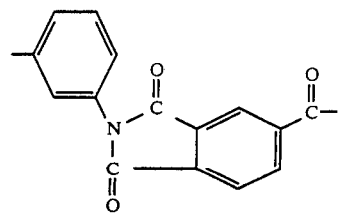

where X can be identical or different, each X being $-O-$, $-S-$, $-SO_2-$, $-CO-$, $-CH_2-$ or $=C(CH_3)_2$, and n is 0 or 1

(b) from 0 to 30 mol% of repeat units of the formulae III and/or IV

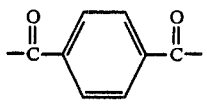 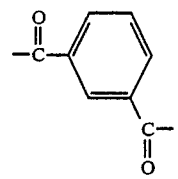

III      IV (c) a molar amount corresponding to the total amount of components (a) and (b) of one or more of the repeat units V, VI, VII, VIII, IX or X in an amount of (c1) from 3 to 35 mol% of units of the formula V

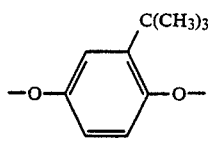

V (c2) from 0 to 10 mol% of units of the formula VI

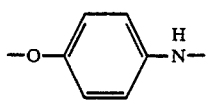

VI (c3) from 2 to 25 mol% of units of the formula VII

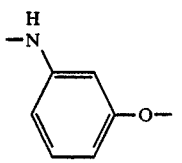

VII (c4) from 2 to 20 mol% of units of the formula VIII

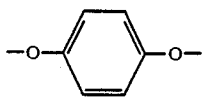
VIII (c5) from 0 to 20 mol% of units of the formula IX

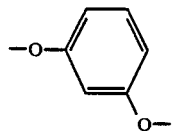
IX (c6) from 2 to 20 mol% of units of the formula X

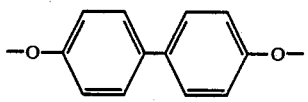
X the total of the mole percentages of components (c1), (c2), (c3), (c4), (c5) and (c6) equalling in each case the total of the mole percentages of components (a) and (b);

(d) not less than 10 mol% of repeat units of the formula XI

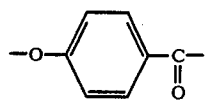
XI (e) from 0 to 25 mol% of one or more of the repeat units of the formula XII, XIII or XIV

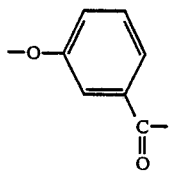
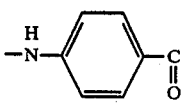
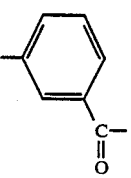

XII   XIII   XIV the mole percentages of components (a), (b), (c), (d) and (e) adding up to 100 mol% in each case.

2. A wholly aromatic mesomorphic polyester amide imide as claimed in claim 1, composed of
(a) from 7 to 25 mol% of repeat units of the formulae I and/or II
(b) from 0 to 20 mol% of repeat units of the formulae III and/or IV
(c) a molar amount corresponding to the total amount of components (a) and (b) of one or more of the repeat units of the formulae V, VI, VII, VIII, IX or X
(d) not less than 10 mol% of repeat units of the formula XI
(e) from 0 to 20 mol% of one or more of the repeat units of the formulae XII, XIII or XIV.

3. A wholly aromatic mesomorphic polyester amide imide as claimed in claim 1, which contains as component (c) from 5 to 25 mol% of units of the formula V, from 2 to 8 mol% of units of the formula VI, from 5 to 20 mol% of units of the formula VII and/or from 5 to 20 mol% of one or more of the units VIII, IX or X.

4. A wholly aromatic mesomorphic polyester amide imide as claimed in claim 1, which contains as component (c) from 5 to 20 mol% of units of the formula V, from 5 to 15 mol% of units of the formula VII and from 5 to 16 mol% of units of the formula VIII and/or X.

5. A wholly aromatic mesomorphic polyester amide imide as claimed in claim 1, which has a glass transition temperature $T_g > 140°$ C.

6. A process for preparing a wholly aromatic mesomorphic polyester amide imide as claimed in claim 1, by reacting the monomers in the form of the underivatized hydroxyamino and carboxy compounds in a single-stage process and in the molar ratios described in the presence of excess fatty acid anhydride at elevated temperatures and distilling fatty acid anhydride and fatty acid out of the reaction mixture.

7. A process as claimed in claim 6, wherein the wholly aromatic polyester amide imide, after the condensation in the melt, is postcondensed in the solid phase at 150°–250° C.

8. A fiber from a polyester amide imide as claimed in claim 1.

9. A film from a polyester amide imide as claimed in claim 1.

10. A molding from a polyester amide imide as claimed in claim 1.

* * * * *